United States Patent
Sarangapani et al.

(10) Patent No.: US 12,551,280 B2
(45) Date of Patent: Feb. 17, 2026

(54) SYSTEMS AND METHODS FOR INTRAOCULAR LENS SELECTION USING EMMETROPIA ZONE PREDICTION

(71) Applicant: ALCON INC., Fribourg (CH)

(72) Inventors: Ramesh Sarangapani, Coppell, TX (US); Mark VonTress, Arlington, TX (US)

(73) Assignee: Alcon Inc., Fribourg (CH)

( * ) Notice: Subject to any disclaimer, the term of this patent is extended or adjusted under 35 U.S.C. 154(b) by 587 days.

(21) Appl. No.: 16/746,231

(22) Filed: Jan. 17, 2020

(65) Prior Publication Data
US 2020/0229870 A1    Jul. 23, 2020

Related U.S. Application Data (60) Provisional application No. 62/795,297, filed on Jan. 22, 2019.

(51) Int. Cl.
*A61B 34/10*     (2016.01)
*A61B 3/117*     (2006.01)
(Continued)

(52) U.S. Cl.
CPC .............. *A61B 34/10* (2016.02); *A61B 3/117* (2013.01); *A61F 2/16* (2013.01); *G16H 50/20* (2018.01);
(Continued)

(58) Field of Classification Search
None
See application file for complete search history.

(56) References Cited

U.S. PATENT DOCUMENTS

2003/0053025 A1   3/2003  Turner
2003/0214628 A1   11/2003  Patel
(Continued)

FOREIGN PATENT DOCUMENTS

AU   2011292287 B2 *  2/2015  .......... A61B 3/0025
CA   2736784 A1   3/2010
(Continued)

OTHER PUBLICATIONS

Canovas et al., Customized eye models for determining optimized intraocular lenses power, Jun. 2011, Biomedical Optics Express, pp. 1649-1663 (Year: 2011).*

(Continued)

*Primary Examiner* — Ryan F Pitaro
*Assistant Examiner* — Bernard E Cothran (57) ABSTRACT

Systems and methods for intraocular lens (IOL) selection using emmetropia zone prediction include determining pre-operative measurements of an eye, estimating a post-operative anterior chamber depth (ACD) of an intraocular lens based on the pre-operative measurements, estimating a post-operative manifest refraction in spherical equivalent (MRSE) of the eye with the IOL implanted based on the pre-operative measurements and the estimated post-operative ACD, determining whether the eye with the IOL implanted is likely to be in an emmetropia zone based on the estimated post-operative MRSE, re-estimating the post-operative MRSE of the eye with the IOL implanted using an emmetropia zone prediction model or a non-emmetropia zone prediction model based on the emmetropia zone determining, and providing the re-estimated post-operative MRSE to a user to aid in selection of an IOL for implantation in the eye.

4 Claims, 6 Drawing Sheets

(51) Int. Cl.
*A61F 2/16* (2006.01)
*G06N 20/00* (2019.01)
*G16H 50/20* (2018.01)
*G16H 50/50* (2018.01)

(52) U.S. Cl.
CPC ........ *G16H 50/50* (2018.01); *A61B 2034/108* (2016.02); *G06N 20/00* (2019.01)

(56) References Cited

U.S. PATENT DOCUMENTS

| | | | |
|---|---|---|---|
| 2004/0246440 A1* | 12/2004 | Andino | B29D 11/00086 |
| | | | 351/159.74 |
| 2011/0242482 A1 | 10/2011 | Olsen | |
| 2014/0028973 A1 | 1/2014 | Scolaro | |
| 2015/0103313 A1 | 4/2015 | Sarver | |
| 2017/0105617 A1 | 4/2017 | Li | |
| 2017/0273779 A1* | 9/2017 | Zhao | A61F 2/1654 |
| 2017/0316571 A1 | 11/2017 | Martínez-enríquez | |
| 2018/0235809 A1 | 8/2018 | Dai | |
| 2018/0296320 A1* | 10/2018 | Gupta | A61B 3/0025 |
| 2018/0368970 A1 | 12/2018 | Findl | |

FOREIGN PATENT DOCUMENTS

| | | |
|---|---|---|
| CN | 1642500 A | 7/2005 |
| CN | 103565395 A | 2/2014 |
| CN | 107072528 A | 8/2017 |
| CN | 107077524 A | 8/2017 |
| EP | 2653095 A1 | 10/2013 |
| JP | 2013236902 A | 11/2013 |
| JP | 2016533781 A | 11/2016 |
| JP | 2017505698 A | 2/2017 |
| JP | 2017077250 A | 4/2017 |
| JP | 2018015440 A | 2/2018 |
| WO | 0185066 A1 | 11/2001 |
| WO | 03082162 A2 | 10/2003 |
| WO | 2010028654 A1 | 3/2010 |
| WO | WO-2013059663 A2 * | 4/2013 ............... A61B 3/09 |
| WO | 2015117155 A1 | 8/2015 |
| WO | 2016008584 A2 | 1/2016 |
| WO | 2016029032 A1 | 2/2016 |
| WO | 2017180914 A1 | 10/2017 |
| WO | WO-2018021561 A1 * | 2/2018 ........... A61B 3/0025 |

OTHER PUBLICATIONS

Barden, What is emmetropia?, Apr. 2021, All About Vision, pp. 1-3 (Year: 2021).*

Translation for WO-2018021561; Endo et al., Ophthalmologic Device and IOL Power Determination Program, 2018, Japan, pp. 1-27 (Year: 2018).*

Translation/Pub for WO-2013059663; Morris et al., Patient Screening Factors for Accommodative Implantable Ophthalmic Devices, 2013, WIPO, pp. 1-44 (Year: 2013).*

Canovas Vidal et al., Customized intraocular lens power calculation system and method, 2012, Australian Patent Office, pp. 1-48 (Year: 2012).*

* cited by examiner

SYSTEMS AND METHODS FOR INTRAOCULAR LENS SELECTION USING EMMETROPIA ZONE PREDICTION

BACKGROUND

Field of the Disclosure

The present disclosure relates to systems and methods to aid in the selection of an intraocular lens to be implanted using emmetropia zone prediction.

Description of Related Art

Cataract surgery involves removing the natural lens of an eye and, in most cases, replacing the natural lens with an artificial intraocular lens (IOL). To achieve an optimal post-operative visual outcome, a good pre-operative surgical plan is crucial. Some of the important pre-operative planning decisions are the selection of an appropriate IOL type and power to achieve a desired manifest refraction in spherical equivalent (MRSE) after IOL implantation.

Typically, the measurements used in the IOL prediction formulas are one-dimensional measurements taken on the optical axis using an optical and/or ultrasound biometer. These traditional measurement practices lead to inaccuracy during the selection of an IOL type and power that results in a suboptimal vision outcome for the patient.

Therefore, there is a need in the art for techniques for better selecting an intraocular lens for implantation that leads to optimized vision outcomes for patients.

SUMMARY

According to some embodiments, a method, performed by one or more computing devices implementing a prediction engine, includes determining one or more pre-operative measurements of an eye, estimating a post-operative anterior chamber depth (ACD) of an intraocular lens (IOL) based on the one or more pre-operative measurements of the eye, estimating a post-operative manifest refraction in spherical equivalent (MRSE) of the eye with the IOL implanted based on the one or more pre-operative measurements of the eye and the estimated post-operative ACD, determining whether the eye with the IOL implanted is likely to be in an emmetropia zone based on the estimated post-operative MRSE, re-estimating the post-operative MRSE of the eye with the IOL implanted using an emmetropia zone prediction model or a non-emmetropia zone prediction model based on the emmetropia zone determining, and providing the re-estimated post-operative MRSE to a user to aid in selection of an IOL for implantation in the eye.

According to some embodiments, a prediction engine includes one or more processors. The prediction engine is configured to determine one or more pre-operative measurements of an eye, estimate a post-operative anterior chamber depth (ACD) of an intraocular lens (IOL) based on the one or more pre-operative measurements of the eye, estimate a post-operative manifest refraction in spherical equivalent (MRSE) of the eye with the IOL implanted based on the one or more pre-operative measurements of the eye and the estimated post-operative ACD, determine whether the eye with the IOL implanted is likely to be in an emmetropia zone based on the estimated post-operative MRSE, re-estimate the post-operative MRSE of the eye with the IOL implanted using an emmetropia zone prediction model or a non-emmetropia zone prediction model based on the emmetropia zone determining, and provide the re-estimated post-operative MRSE to a user to aid in selection of an IOL for implantation in the eye.

According to some embodiments, a non-transitory machine-readable medium comprising a plurality of machine-readable instructions which when executed by one or more processors are adapted to cause the one or more processors to perform a method. The method includes determining one or more pre-operative measurements of an eye, estimating a post-operative anterior chamber depth (ACD) of an intraocular lens (IOL) based on the one or more pre-operative measurements of the eye, estimating a post-operative manifest refraction in spherical equivalent (MRSE) of the eye with the IOL implanted based on the one or more pre-operative measurements of the eye and the estimated post-operative ACD, determining whether the eye with the IOL implanted is likely to be in an emmetropia zone based on the estimated post-operative MRSE, re-estimating the post-operative MRSE of the eye with the IOL implanted using an emmetropia zone prediction model or a non-emmetropia zone prediction model based on the emmetropia zone determining, and providing the re-estimated post-operative MRSE to a user to aid in selection of an IOL for implantation in the eye.

BRIEF DESCRIPTION OF THE DRAWINGS

For a more complete understanding of the present technology, its features, and its advantages, reference is made to the following description, taken in conjunction with the accompanying drawings.

In the figures, elements having the same designations have the same or similar functions.

DETAILED DESCRIPTION

This description and the accompanying drawings that illustrate inventive aspects, embodiments, implementations, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The technology described below involves systems and methods to better estimate post implantation vision outcomes for a new patient by estimating a post-operative MRSE for the patient. The systems and methods use multiple prediction models to estimate the post-operative MRSE for several IOLs and IOL powers to aid a surgeon and patient in the selection of an IOL most likely to provide a desired post-operative vision outcome. More specifically, the systems and methods use one or more models to determine whether a candidate IOL is likely to lead to a post-operative vision outcome within the emmetropia zone (i.e., a post-operative vision outcome where the patient does not need to supplement the IOL with an additional corrective lens, such as glasses) or outside the emmetropia zone and then using separate prediction models to estimate the post-operative MRSE for an IOL predicted to lead to a vision outcome in the emmetropia zone and an IOL predicted to lead to a vision outcome outside the emmetropia zone.

Figure 1:
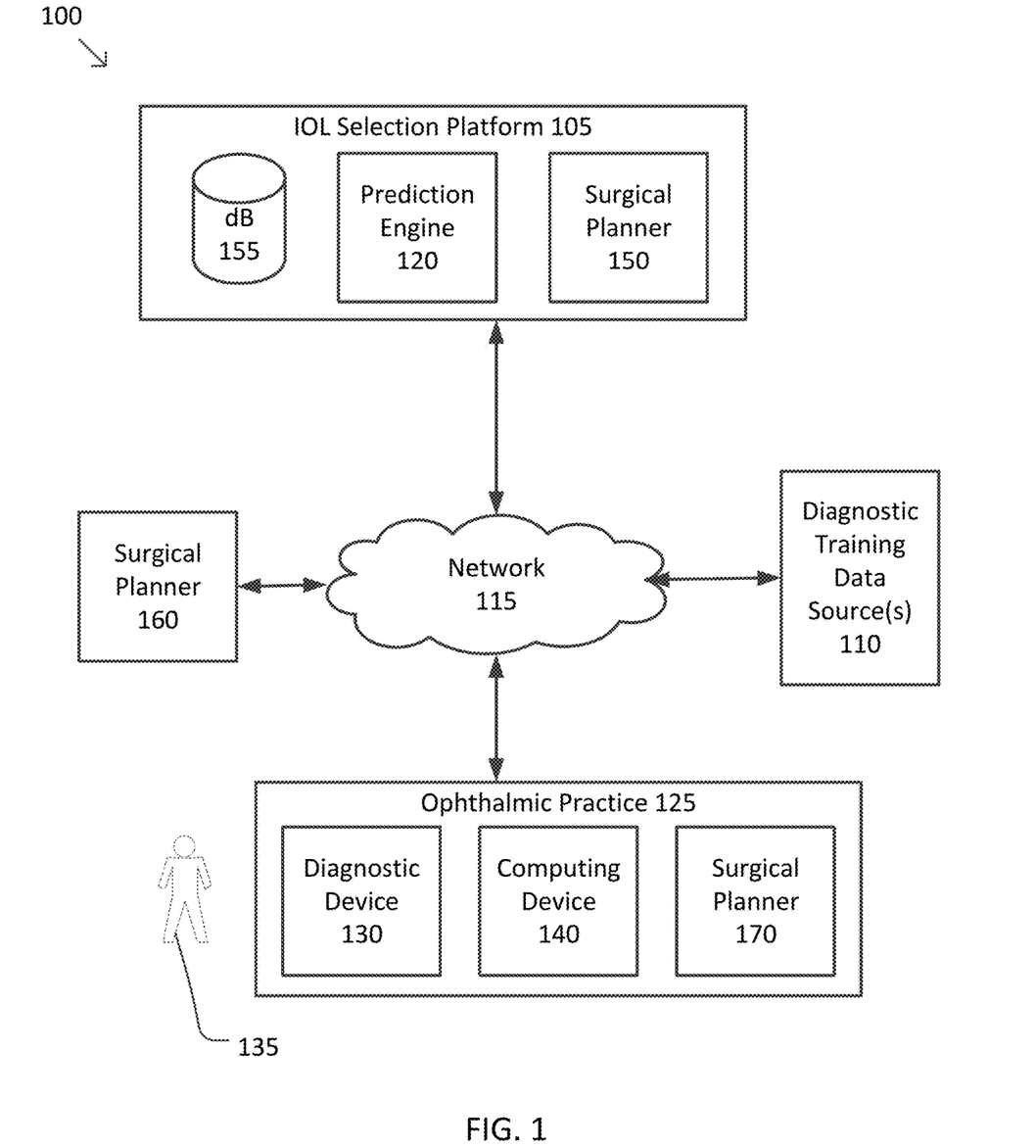
FIG. 1 is a diagram of a system for IOL selection according to some embodiments.

FIG. 1 illustrates a system 100 for a system for IOL selection according to some embodiments. System 100 includes an IOL selection platform 105 coupled with one or more diagnostic training data sources 110 via a network 115. In some examples, network 115 may include one or more switching devices, routers, local area networks (e.g., an Ethernet), wide area networks (e.g., the Internet), and/or the like. Each of the diagnostic training data sources 110 may be a database, a data repository, and/or the like made available by an, ophthalmic surgery practice, an eye clinic, a medical university, an electronic medical records (EMR) repository, and/or the like. Each of the diagnostic training data sources 110 may provide IOL selection platform 105 with training data in the form of one or more of multi-dimensional images and/or measurements of patients' pre- and post-operative eyes, surgical planning data, surgical console parameter logs, surgical complication logs, patient medical history, patient demographic data, information on an implanted IOL, and/or the like. IOL selection platform 105 may store the training data in one or more databases 155 which may be configured to anonymize, encrypt, and/or otherwise safeguard the training data.

IOL selection platform 105 includes a prediction engine 120 which may (as explained in greater detail below) process the received training data, extract measurements of an eye, perform raw data analysis on the training data, train machine learning algorithms and/or models to estimate a post-operative MRSE based on the pre-operative measurements, and iteratively refine the machine learning to optimize the various models used to predict the post-operative MRSE to improve their use with future patients to improve their post-operative vision outcomes (e.g., better optical properties of the eye with the implanted IOL). In some examples, prediction engine 120 may use one or more models (e.g., one or more a neural networks) that are trained based on pre-operative measurements and corresponding post-operative outcomes obtained from the one or more diagnostic training data sources 110.

IOL selection platform 105 is further coupled, via network 115, to one or more devices of an ophthalmic practice 125. The one or more devices include a diagnostic device 130. Diagnostic device 130 is used to obtain one or more multi-dimensional images and/or other measurements of an eye of a patient 135. Diagnostic device 130 may be any of a number of devices for obtaining multi-dimensional images and/or measurements of ophthalmic anatomy such as an optical coherence tomography (OCT) device, a rotating camera (e.g., a Scheimpflug camera), a magnetic resonance imaging (MRI) device, a keratometer, an ophthalmometer, an optical biometer, and/or the like.

The ophthalmic practice 125 may also include one or more computing devices 140 for obtaining, from the diagnostic device 130, the multi-dimensional images and/or measurements of patient 135 and sending them to IOL selection platform 105. The one or more computing devices 140 may be one or more of a stand-alone computer, a tablet and/or other smart device, a surgical console, a computing device integrated into the diagnostic device 130, and/or the like.

IOL selection platform 105 may receive measurements of patient 135, and/or compute values from the measurements, and generate an estimate of the post-operative MRSE for various IOLs and IOL powers using prediction engine 120. Prediction engine may then be used to help select an IOL and IOL power for patient 135 by providing ophthalmic practice 125 and/or a surgeon or other user with the estimated post-operative MRSE for the various IOLs and IOL powers.

Diagnostic device 130 may further be used to obtain post-operative measurements of patient 135 after the patient undergoes cataract removal and IOL implantation using the selected IOL. The one or more computing devices 140 may then send the post-operative multi-dimensional images and/or measurements of patient 135 and the selected IOL to IOL selection platform 105 for use in iteratively training and/or updating the models used by prediction engine 120 so as to incorporate information from patient 135 for use with future patients.

The estimated post-operative MRSE, selected IOL, and/or selected IOL power may be displayed on computing device 140 and/or another computing device, display, surgical console, and/or the like. Additionally, IOL selection platform 105 and/or the one or more computing devices 140 may identify in the measurements various characteristics of the anatomy of patient 135, as explained below in more detail. Further, IOL selection platform 105 and/or the one or more computing devices 140 may create graphical elements that identify, highlight, and/or otherwise depict the patient anatomy and/or the measured characteristics. IOL selection platform 105 and/or the one or more computing devices 140 may supplement the measurements with the graphical elements.

In some embodiments, IOL selection platform 105 may further include a surgical planner 150 that may be used to provide one or more surgical plans to ophthalmic practice 125 that uses the estimated post-operative MRSE, the selected IOL, and/or the selected IOL power.

In some embodiments, system 100 may further include a stand-alone surgical planner 160 and/or ophthalmic practice 125 may further include a surgical planner module 170 on the one or more computing device 140.

As discussed above and further emphasized here, FIG. 1 is merely an example which should not unduly limit the scope of the claims. One of ordinary skill in the art would recognize many variations, alternatives, and modifications. According to some embodiments, IOL selection platform 130 and/or one or more components of IOL selection platform 130, such as databases 155, prediction engine 120, and/or surgical planner 150, may be integrated into the one or more devices of ophthalmic practice 125. In some examples, computing device 140 may host IOL selection platform 105, databases 155, prediction engine 120, and/or surgical planner 150. In some examples, surgical planner 150 may be combined with surgical planner 170.

Figure 2:
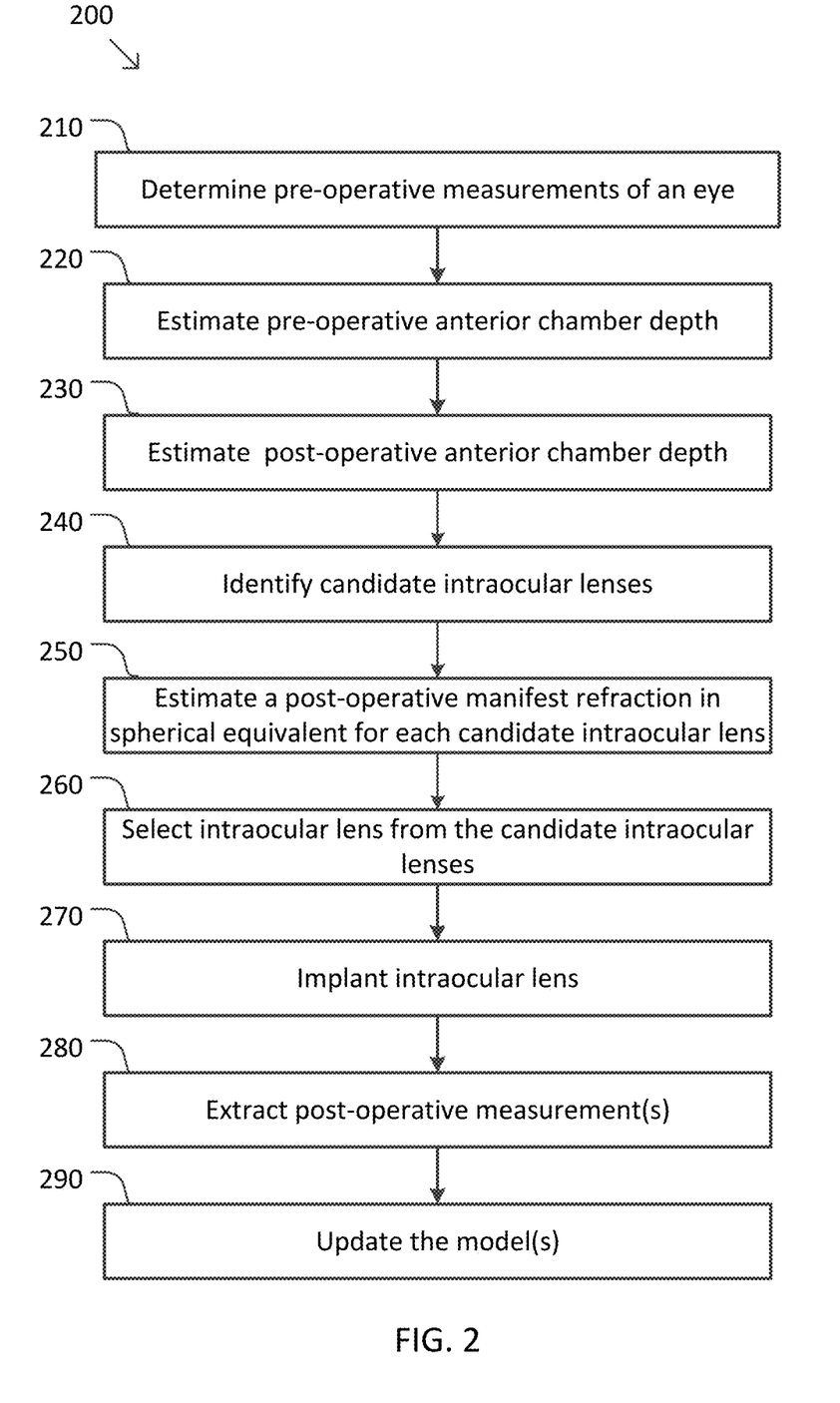
FIG. 2 is a diagram of a method of implanting an IOL according to some embodiments.

FIG. 2 is a diagram of a method 200 of implanting an IOL according to some embodiments. One or more of the processes 210-290 of method 200 may be implemented, at least in part, in the form of executable code stored on non-transitory, tangible, machine-readable media that when run by one or more processors (e.g., the processors of prediction engine 120, IOL prediction platform, diagnostic device 130, the one or more computing devices 140, and/or one or more of the surgical planners 150, 160, and/or 170) may cause the one or more processors to perform one or more of the processes 210-290. According to some embodiments, processes 280 and/or 290 are optional and may be omitted.

Figure 3:
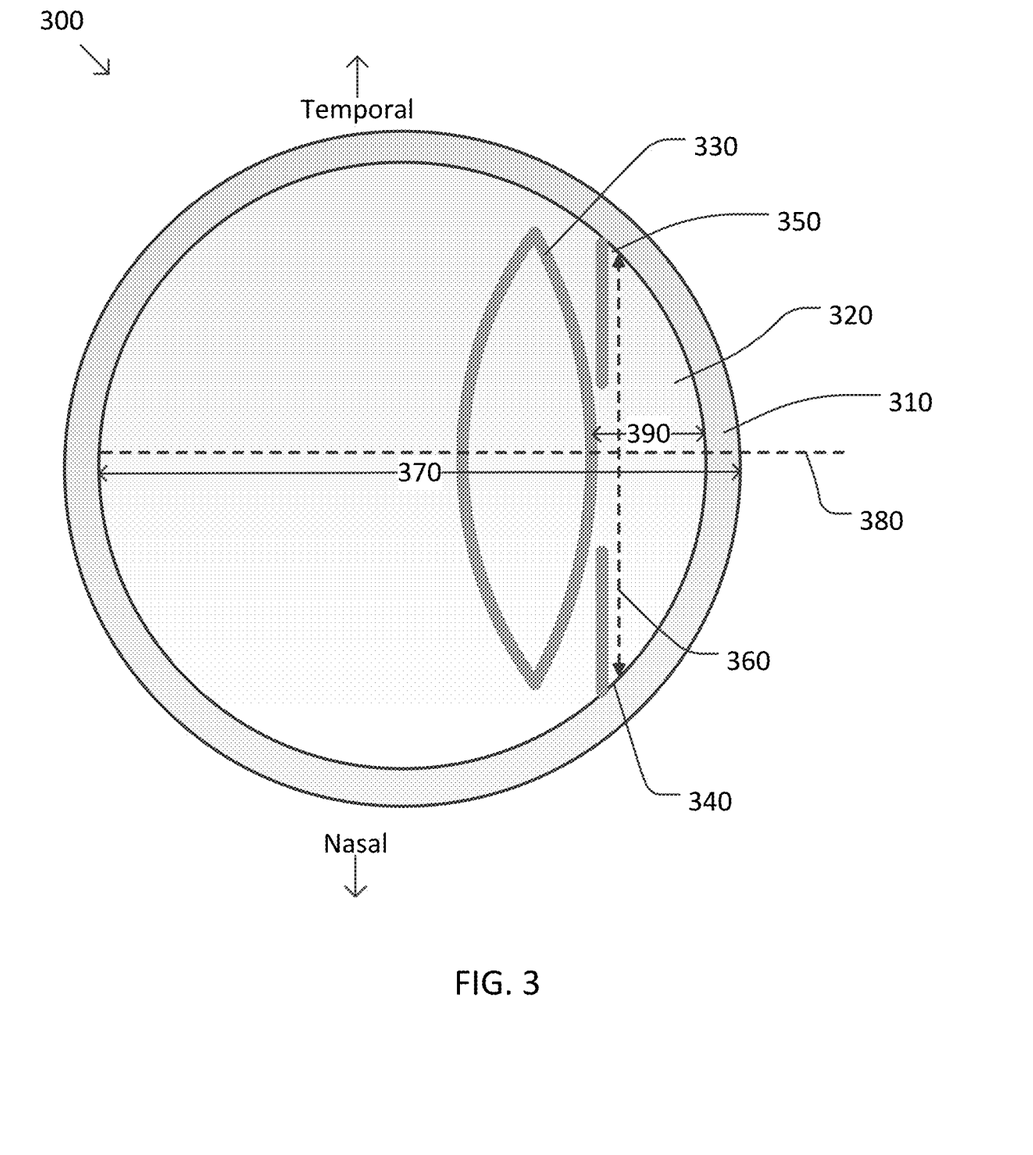
FIG. 3 is a diagram of an eye and characteristics of the eye according to some embodiments.

At a process 210, one or more pre-operative measurements of an eye are determined. In some examples, one or more of the pre-operative measurements may be extracted from one or more pre-operative images of the eye obtained using a diagnostic device, such as diagnostic device 130, an OCT device, a rotating (e.g., Scheimpflug) camera, an MII device, and/or the like. In some examples, one or more of the pre-operative measurements may be determined using one or more measuring devices, such as diagnostic device 130, a keratometer, an ophthalmometer, an optical biometer, and/or the like. Process 210 is described in the context of FIG. 3, which is a diagram of an eye 300 and characteristics of the eye according to some embodiments. As shown in FIG. 3, eye 300 includes a cornea 310, an anterior chamber 320, and a lens 330.

In some embodiments, one measurement of interest for eye 300 is the white-to-white diameter of cornea 310. In some examples, the white-to-white diameter of cornea 310 may be measured using an optical biometer. In some examples, the white-to-white diameter of cornea 310 may be determined by analyzing one or more images of eye 300. In some examples, the one or more images may be analyzed to identify nasal and temporal angles 340 and 350, respectively, of anterior chamber 320. In some examples, nasal and temporal angles 340 and 350 of anterior chamber 320 may be identified from the one or more images by identifying the structures identifying anterior chamber 320 (e.g., using one or more edge detection and/or region detection algorithms) and noting the acute angles at the edges of anterior chamber 320 located toward the temporal and nasal extents of anterior chamber 320. Once identified, a distance between the nasal and temporal angles 340 and 350 may be measured to determine the white-to-white diameter of cornea 310, which corresponds to a length of line 360 between nasal and temporal angles 340 and 350.

In some embodiments, one measurement of interest for eye 300 is the average keratometry or roundness of the anterior surface of cornea 310. In some examples, the average keratometry of cornea 310 may be measured using the one or more images of eye 300, a keratometer, and/or the like. In some examples, the average keratometry of cornea 310 may be base based on an average of the steep keratometry and the shallow keratometry measurements of cornea 310. In some examples, the average keratometry of cornea 310 may be expressed as a radius of curvature (rc) of cornea 310, which is 337.5 divided by the average keratometry.

In some embodiments, one measurement of interest from eye 300 is the axial length 370 of eye 300 as measured from the anterior surface of cornea 310 to the retina along central axis 380 of eye 300. In some examples, axial length 370 may be determined using the one or more images of eye 300, biometry of the eye, and/or the like.

Referring back to FIG. 2, at a process 220, a pre-operative anterior chamber depth (ACD) of the eye is estimated. In the examples, of FIG. 3, the pre-operative ACD 390 corresponds to the distance between the posterior surface of cornea 310 and the anterior surface of the pre-operative lens 330. In some examples, the pre-operative ACD may be estimated using a combination of one or more geometric models of the eye and a first correction model. In some examples, each of the one or more geometric models provide an initial estimate of the pre-operative ACD based on the radius of curvature (rc) of the cornea, the axial length of the eye, and the white-to-white diameter of the cornea as measured during process 210. In some examples, each of the one or more geometric models of the eye may be determined by fitting each of the one or more geometric models using, for example, a least squares approach to data from the eyes of previous patients where the radius of curvature, axial length, white-to-white diameter, and anterior chamber depth are known. In some examples, the data may be stored in a data source, such as data source 110. Each of the initial estimates of the pre-operative ACD, the radius of curvature, axial length, and white-to-white diameter are then passed to the first correction model that refines the one or more initial estimates of the pre-operative ACD to provide a more accurate estimate of the pre-operative ACD. In some examples, the first correction model may include a neural network trained using the data from the eyes of previous patients.

At a process 230, a post-operative anterior chamber depth (ACD) of the eye is estimated. In the examples, of FIG. 3, the post-operative ACD 390 corresponds to the distance between the posterior surface of cornea 310 and the anterior surface of an IOL to be implanted into eye 300. In some examples, the post-operative ACD may be estimated using a combination of the one or more geometric models of the eye used during process 220 and a first prediction model. Each of the initial estimates of the pre-operative ACD from process 220, the radius of curvature, axial length, and white-to-white diameter are then passed to the first prediction model to generate the estimate of the post-operative ACD. In some examples, the first prediction model may include a neural network trained using the data from the eyes of previous patients including information about the post-operative ACD for each implanted IOL.

At a process 240, one or more candidate intraocular lenses (IOLs) are identified. In some examples, the one or more candidate IOLs may be selected by the surgeon or other user based on one or more of the IOLs that are available, past experience, preference, current vision issues of the patient, anticipated vision outcomes for the patient, and/or the like. Each of the one or more candidate IOLs has a corresponding type and IOL power.

Figure 4:
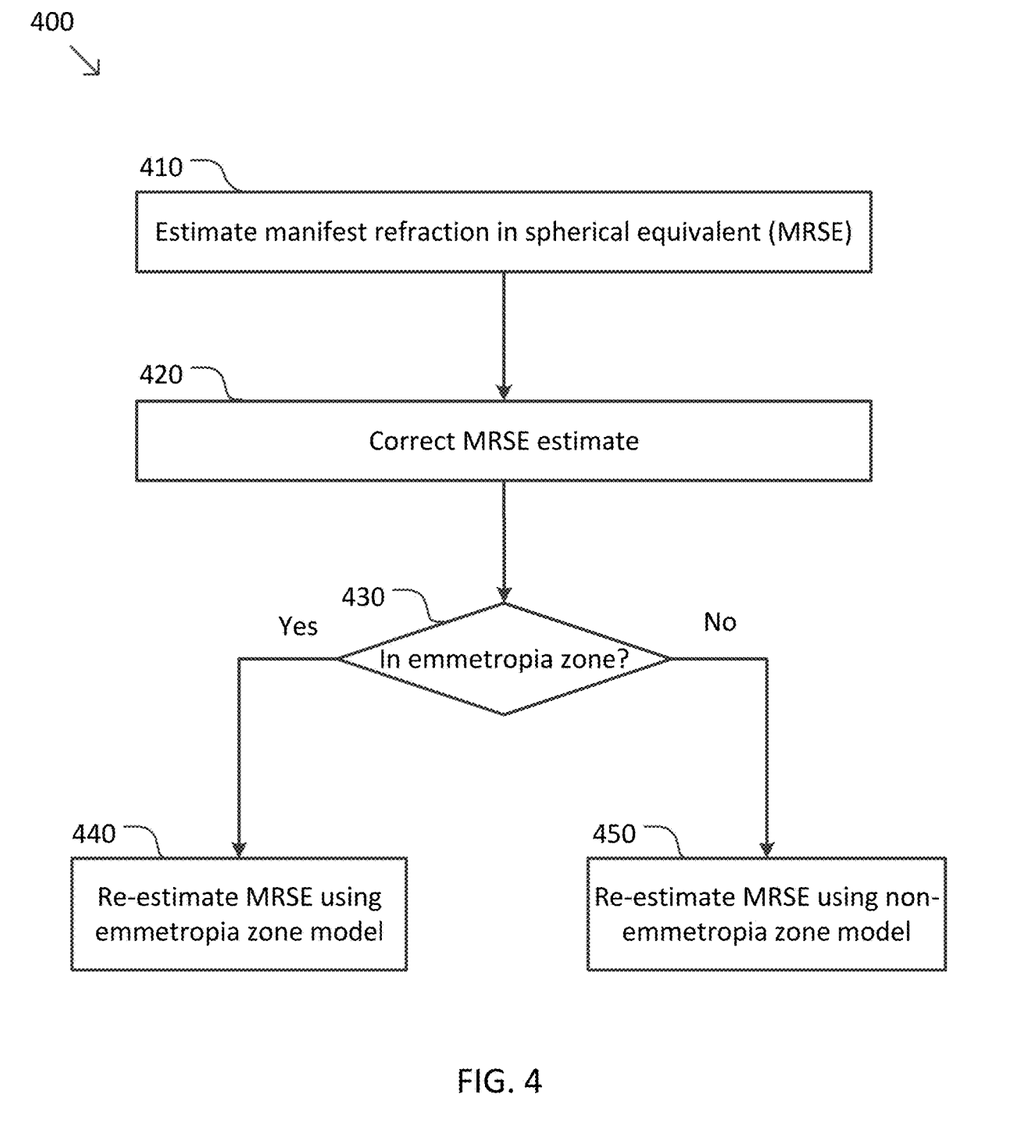
FIG. 4 is a diagram of a method of evaluating an IOL and IOL power according to some embodiments.

At a process 250, a post-operative manifest refraction in spherical equivalent (MRSE) is estimated for each of the candidate IOLs identified during process 240. The MRSE is indicated in diopters (D). According to some embodiments, the MRSE for each of the candidate IOLs may be determined using a method of evaluating an IOL and IOL power, such as a method 400 as shown in FIG. 4. One or more of the processes 410-450 of method 400 may be implemented, at least in part, in the form of executable code stored on non-transitory, tangible, machine-readable media that when run by one or more processors (e.g., the processors of prediction engine 120, IOL prediction platform, and/or the like) may cause the one or more processors to perform one or more of the processes 410-450.

At a process 410, the post-operative MRSE is estimated. In some examples, the post-operative MRSE may be estimated based on one or more of the white-to-white diameter determined during process 210, the average keratometry of the eye determined during process 210, the axial length determined during process 210, the pre-operative ACD estimated during process 220, the post-operative ACD estimated during process 230, the IOL type of the IOL being evaluated, the IOL power of the IOL being evaluated, and/or the like. In some examples, process 410 may use a ray tracing approach that uses a paraxial model eye constructed to represent a pseudophakic eye implanted with the IOL being evaluated. In the ray tracing model, a ray entering the eye sequentially passes through the anterior surface of the cornea, the posterior surface of the cornea, the anterior surface of the IOL, and the posterior surface of the IOL, before finally reaching the surface of the retina. The shape of each of these surfaces is defined as a biconic shape using parameters from measurements of the eye determined during process 210, the design profile of the IOL, the estimated post-operative ACD, and known models of the eye. The refractive indices of the ocular material or medium in the cornea, the anterior chamber, the other parts of the eye are known from models of the eye and/or models of the IOL In some embodiments, the ray tracing is used to "measure" a whole-eye wave front from the paraxial model eye. Rays are traced from the center of the retina (e.g., the fovea), radiating towards the anterior surface of the cornea in all directions. A planar surface is placed at the apex of the anterior surface of the cornea. The loci of intersection of the ray with the planar surface upon exiting the eye and the corresponding optical path length are recorded. In some examples, ray data within a circular aperture (e.g., corresponding to an entrance pupil) of 3.5 m in diameter is used to calculate the whole-eye wave front.

In some examples, the estimated post-operative MRSE may be calculated using Zernike polynomials from the representation of the whole-eye wave front. In some examples, the estimated post-operative MRSE includes a combination of both spherical and cylindrical refractive power of the eye with an implanted IOL corresponding to the IOL being evaluated. The ray tracing approach is described in more detail in Canovas, "Customized Eye Models for Determining Optimized Intraocular Lens Power," Biomedical Optics Express Vol. 2 (6), 1649-1663, 2011.

At a process 420, the estimated post-operative MRSE from process 410 is corrected. In some examples, the estimated post-operative MRSE may be corrected using a second correction model. The second correction model may use one or more of the measurements of the eye determined during process 210 (e.g., the white-to-white diameter, the average keratometry, and/or the axial length), the post-operative ACD estimated during process 230, and/or the post-operative MRSE estimated during process 410 to determine a correction to the post-operative MRSE estimated during process 410. In some examples, the second correction model may include a neural network trained using data from the eyes of previous patients including both estimated and actual post-operative MRSEs. In some examples, the second correction model may determine a correction value that is added to the post-operative MRSE estimated during process 410 to obtain a corrected estimate of the post-operative MRSE.

At a process 430, it is determined whether the IOL being evaluated places the post-operative eye in the emmetropia zone. In some examples, the post-operative eye is considered to be in the emmetropia zone when the post-operative MRSE is within half a diopter of a desired post-operative MRSE for the eye so that the post-operative eye is unlikely to need an additional corrective lens. (E.g., when an absolute difference between the desired and actual post-operative MRSEs are within a half diopter of each other.) In some examples, whether the IOL being evaluated places the post-operative eye in the emmetropia zone may be determined by taking the absolute difference between the corrected estimate of the post-operative MRSE determined during process 420 and the desired post-operative MRSE for the eye so see whether it is less than half a diopter.

In some examples, a more robust test of whether the IOL being evaluated places the post-operative eye in the emmetropia zone may be preferred because the corrected estimate of the post-operative ACD is merely an estimate. In some examples, a more robust classifier for determining whether the IOL being evaluated places the post-operative eye in the emmetropia zone may be developed using statistical techniques, such as a logistic regression based on bivariate density quantiles and a receiver operating characteristic (ROC) curve. In some examples, this approach may fit a regression curve, such as a logistic regression curve, between pairs of data that include previous corrected estimates of the post-operative MRSE and corresponding actual post-operative MRSE values from implanted IOLs. Bivariate quantiles may then be used with the regression curve to provide a classifier that predicts the likelihood that the actual post-operative MRSE will be within the emmetropia zone (e.g., within a half diopter of the desired post-operative MRSE). A ROC curve may then be used to determine a threshold of likelihood that should be exceeded to reliably conclude that the implanted IOL will place the post-operative eye will be in the emmetropia zone. Use of the ROC curve accounts for predictions that result in false positive and false negative determinations as to whether the post-operative eye will be in the emmetropia zone, thus, providing a classification approach that better maximizes both sensitivity and specificity of the regression-based classifier. Thus, use of this approach provides an estimated likelihood of whether the IOL being evaluated will result in the post-operative eye being in the emmetropia zone and a threshold likelihood that should be exceeded in order to conclude that the post-operative eye will be in the emmetropia zone using the IOL being evaluated. ROC curves are described in more detail in Greiner, et al., "Principles and Practical Application of the Receiver-Operating Characteristic Analysis for Diagnostic Tests," Preventive Veterinary Medicine, v45, 2000 pp. 23-41 and Fawcett, "An Introduction to ROC Analysis," Pattern Recognition Letters, v27, 2000, pp. 861-874, each of which is incorporated by reference.

When it is determined that the IOL being evaluated is likely to place the post-operative eye in the emmetropia zone (e.g., the likelihood predicted by the classifier is greater than or equal to the threshold from the ROC curve), the post-operative MRSE is re-estimated using an emmetropia zone prediction model using a process 440. When it is determined that the IOL being evaluated is not likely to place the post-operative eye in the emmetropia zone, the post-operative MRSE is re-estimated using a non-emmetropia zone prediction model using a process 450.

At the process, 440 an emmetropia zone prediction model is used to re-estimate the post-operative MRSE for the IOL being evaluated. In some examples, the emmetropia zone prediction model may use one or more of the measurements of the eye determined during process 210 (e.g., the white-to-white diameter, the average keratometry, and/or the axial length), and/or the post-operative ACD estimated during process 230 to re-estimate the post-operative MRSE. In some examples, the emmetropia zone prediction model may include a neural network trained using data from the eyes of previous patients including both estimated and actual post-operative MRSEs where the post-operative eye was placed in the emmetropia zone. Once the post-operative MRSE is re-estimated using the emmetropia zone prediction model, method 400 concludes.

At the process, 450 a non-emmetropia zone prediction model is used to re-estimate the post-operative MRSE for the IOL being evaluated. In some examples, the non-emmetropia zone prediction model may use one or more of the measurements of the eye determined during process 210 (e.g., the white-to-white diameter, the average keratometry, and/or the axial length), and/or the post-operative ACD estimated during process 230 to re-estimate the post-operative MRSE. In some examples, the non-emmetropia zone prediction model may include a neural network trained using data from the eyes of previous patients including both estimated and actual post-operative MRSEs where the post-operative eye was placed in the non-emmetropia zone. Once the post-operative MRSE is re-estimated using the non-emmetropia zone prediction model, method 400 concludes.

Referring back to FIG. 2, at a process 260, an IOL is selected from among the candidate IOLs. In some examples, process 260 may include providing information via a user interface to the surgeon, another user, and/or the patient so that an appropriate IOL may be selected for implantation. In some examples, the information may include, for each of the candidate IOLs identified during process 240, the IOL type, the IOL power, the estimated post-operative ACD from process 230, the emmetropia zone determination from process 430, the corrected post-operative estimate of MRSE from process 420, the re-estimated post-operative MRSE from process 440 or 450 (as applicable), the difference between the re-estimated post-operative MRSE and a desired post-operative MRSE, and/or the like. In some examples, the candidate IOLs may be separated into groups based on the emmetropia zone determination from process 430 and/or sorted based on the actual difference or absolute difference between the re-estimated post-operative MRSE and a desired post-operative MRSE. In some examples, the surgeon or other user may select the IOL by selecting from the list of results, clicking a link, pressing a button, and/or the like.

At a process 270, the IOL is implanted. In some examples, the IOL selected during process 260 is implanted in the eye by the surgeon.

At a process 280, one or more post-operative measurements of the eye are obtained. In some examples, the one or more post-operative measurements may include an actual post-operative ACD of the IOL after implantation of the IOL, an actual post-operative MRSE after implantation of the IOL, an actual post-operative emmetropia zone determination, and/or the like. In some examples, the actual post-operative ACD and/or the actual post-operative MRSE may be determined based on one or more images of the post-operative eye, one or more physiological and/or optical measurements of the post-operative eye, and/or the like.

At a process 290, the one or more models used by methods 200 and/or 400 are updated. In some examples, the one or more pre-operative measurements determined during process 210, the actual post-operative ACD determined during process 280, the actual post-operative MRSE, the actual post-operative emmetropia zone determination, and/or the like may be used as additional training data for any of the one or more geometric models of process 220, the first correction model of process 220, the first prediction model of process 230, the second correction model of process 420, the emmetropia zone prediction model of process 440, or the non-emmetropia zone prediction model of process 450. In some examples, the additional training data may be added to a data source, such as data source 110. In some examples, the updating may include one or more of updating least-squares fits, feedback to neural networks (e.g., using back propagation), and/or the like. In some examples, one or more of the models may be trained using one or more loss functions based on their ability to correctly predict the post-operative MRSE for the various candidate IOLs. In some examples, the one or more loss functions may include a mean absolute error loss function (MAPE) determined according to Equation 1 and/or a probability of half diopter prediction success loss function (MAE) determined according to Equation 2, where $MRSEAct_i$ and $MRSEEst_i$ are the actual and estimated post-operative MRSE for ith training example and N is the number of training samples.

$$MAPE = \frac{1}{N}\sum_{i=1}^{N} |MRSEAct_i - MRSEEst_i| \qquad \text{Equation 1}$$

$$Success_i = \begin{cases} |MRSEAct_i - MRSEEst_i| \leq 0.5\ D & 1 \\ |MRSEAct_i - MRSEEst_i| > 0.5\ D & 0 \end{cases} \qquad \text{Equation 2}$$

$$MAE = \frac{1}{N}\sum_{i=1}^{N} Success_i$$

Figure 5A:
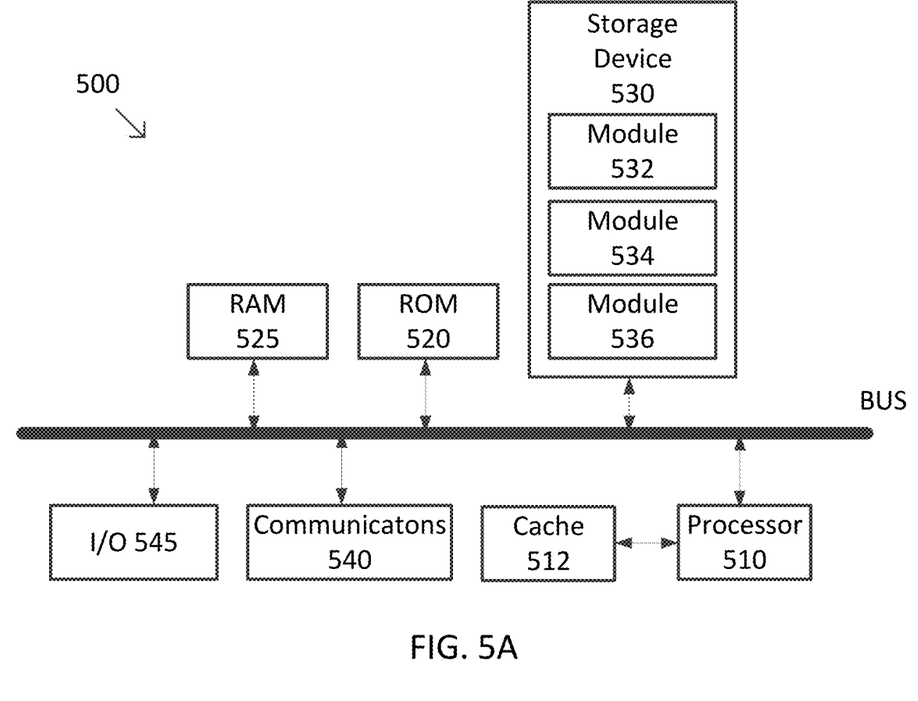
FIGS. 5A and 5B are diagrams of processing systems according to some embodiments.
Figure 5B:
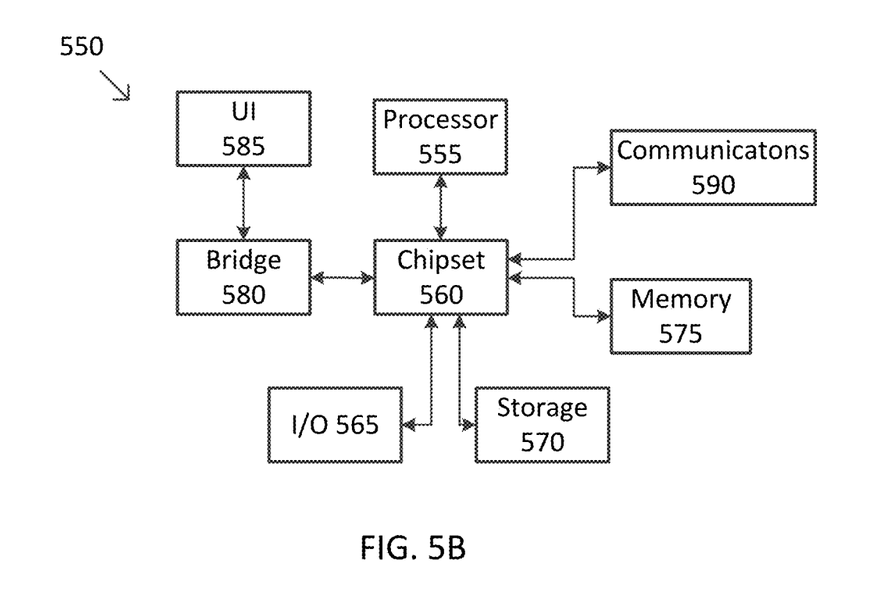

FIGS. 5A and 5B are diagrams of processing systems according to some embodiments. Although two embodiments are shown in FIGS. 5A and 5B, persons of ordinary skill in the art will also readily appreciate that other system embodiments are possible. According to some embodiments, the processing systems of FIGS. 5A and/or 5B are representative of computing systems that may be included in one or more of IOL selection platform 105, ophthalmic practice 125, prediction engine 120, diagnostic device 130, the one or more computing devices 140, any of surgical planner 150, 160, and/or 170, and/or the like.

FIG. 5A illustrates a computing system 500 where the components of system 500 are in electrical communication with each other using a bus 505. System 500 includes a processor 510 and a system bus 505 that couples various system components including memory in the form of a read only memory (ROM) 520, a random access memory (RAM) 525, and/or the like (e.g., PROM, EPROM, FLASH-EPROM, and/or any other memory chip or cartridge) to processor 510. System 500 may further include a cache 512 of high-speed memory connected directly with, in close proximity to, or integrated as part of processor 510. System 500 may access data stored in ROM 520, RAM 525, and/or one or more storage devices 530 through cache 512 for high-speed access by processor 510. In some examples, cache 512 may provide a performance boost that avoids delays by processor 510 in accessing data from memory 515, ROM 520, RAM 525, and/or the one or more storage devices 530 previously stored in cache 512. In some examples, the one or more storage devices 530 store one or more software modules (e.g., software modules 532, 534, 536, and/or the like). Software modules 532, 534, and/or 536 may control and/or be configured to control processor 510 to perform various actions, such as the processes of methods 200 and/or 300. And although system 500 is shown with only one processor 510, it is understood that processor 510 may be representative of one or more central processing units (CPUs), multi-core processors, microprocessors, microcontrollers, digital signal processors (DSPs), field programmable gate arrays (FPGAs), application specific integrated circuits (ASICs), graphics processing units (GPUs), tensor processing units (TPUs), and/or the like. In some examples, system 500 may be implemented as a stand-alone subsystem and/or as a board added to a computing device or as a virtual machine.

To enable user interaction with system 500, system 500 includes one or more communication interfaces 540 and/or one or more input/output (I/O) devices 545. In some examples, the one or more communication interfaces 540 may include one or more network interfaces, network interface cards, and/or the like to provide communication according to one or more network and/or communication bus standards. In some examples, the one or more communication interfaces 540 may include interfaces for communicating with system 500 via a network, such as network 115. In some examples, the one or more I/O devices 545 may include on or more user interface devices (e.g., keyboards, pointing/selection devices (e.g., mice, touch pads, scroll wheels, track balls, touch screens, and/or the like), audio devices (e.g., microphones and/or speakers), sensors, actuators, display devices, and/or the like).

Each of the one or more storage devices 530 may include non-transitory and non-volatile storage such as that provided by a hard disk, an optical medium, a solid-state drive, and/or the like. In some examples, each of the one or more storage devices 530 may be co-located with system 500 (e.g., a local storage device) and/or remote from system 500 (e.g., a cloud storage device).

FIG. 5B illustrates a computing system 550 based on a chipset architecture that may be used in performing any of the methods (e.g., methods 200 and/or 300) described herein. System 550 may include a processor 555, representative of any number of physically and/or logically distinct resources capable of executing software, firmware, and/or other computations, such as one or more CPUs, multi-core processors, microprocessors, microcontrollers, DSPs, FPGAs, ASICs, GPUs, TPUs, and/or the like. As shown, processor 555 is aided by one or more chipsets 560, which may also include one or more CPUs, multi-core processors, microprocessors, microcontrollers, DSPs, FPGAs, ASICs, GPUs, TPUs, co-processors, coder-decoders (CODECs), and/or the like. As shown, the one or more chipsets 560 interface processor 555 with one or more of one or more I/O devices 565, one or more storage devices 570, memory 575, a bridge 580, and/or one or more communication interfaces 590. In some examples, the one or more I/O devices 565, one or more storage devices 570, memory, and/or one or more communication interfaces 590 may correspond to the similarly named counterparts in FIG. 5A and system 500.

In some examples, bridge 580 may provide an additional interface for providing system 550 with access to one or more user interface (UI) components, such as one or more keyboards, pointing/selection devices (e.g., mice, touch pads, scroll wheels, track balls, touch screens, and/or the like), audio devices (e.g., microphones and/or speakers), display devices, and/or the like.

According to some embodiments, systems 500 and/or 560 may provide a graphical user interface (GUI) suitable for aiding a user (e.g., a surgeon and/or other medical personnel) in the performance of the processes of methods 200 and/or 300. The GUI may include instructions regarding the next actions to be performed, diagrams of annotated and/or un-annotated anatomy, such as pre-operative and/or post-operative images of an eye (e.g., such as depicted in FIG. 4), requests for input, and/or the like. In some examples, the GUI may display true-color and/or false-color images of the anatomy, and/or the like.

Figure 6:
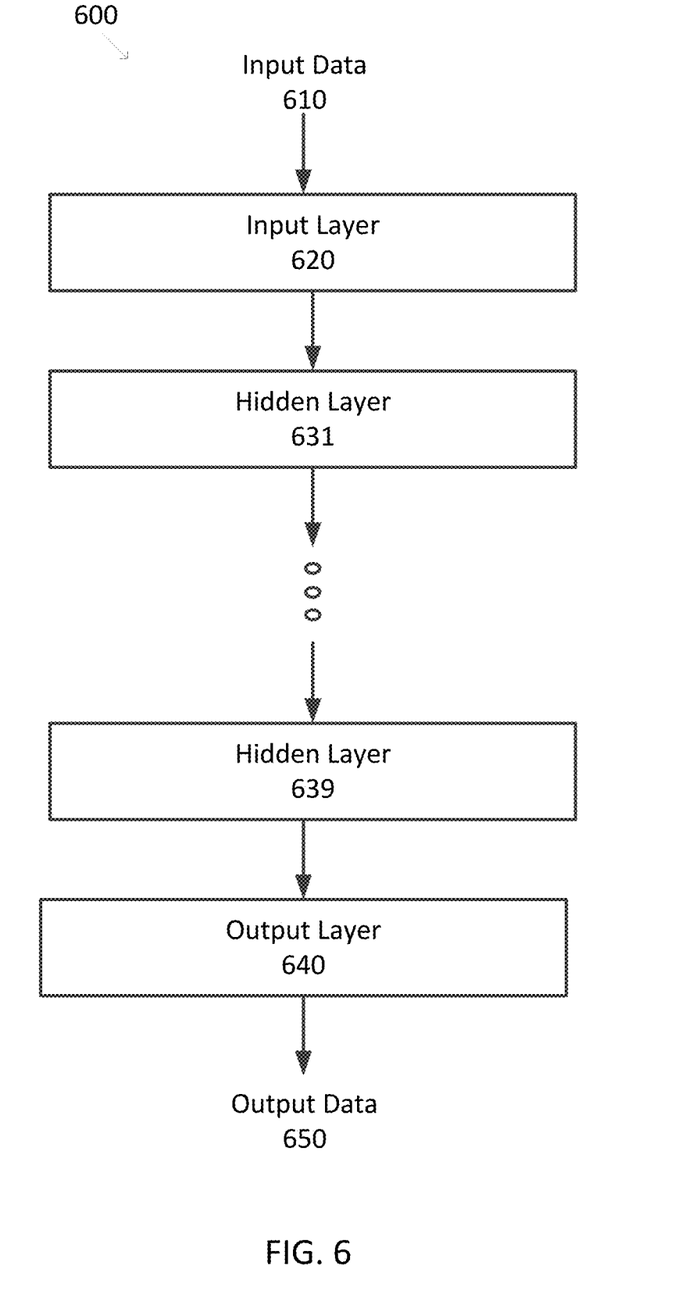
FIG. 6 is a diagram of a multi-layer neural network according to some embodiments.

FIG. 6 is a diagram of a multi-layer neural network 600 according to some embodiments. In some embodiments, neural network 600 may be representative of a neural network used to implement each of the one or more models described with respect to processes 220, 230, 420, 440, and/or 450 and used by prediction engine 120. Neural network 600 processes input data 610 using an input layer 620. In some examples, input data 610 may correspond to the input data provided to the one or more models and/or the training data provided to the one or more models during the updating during process 290 used to train the one or more models. Input layer 620 includes a plurality of neurons that are used to condition input data 610 by scaling, range limiting, and/or the like. Each of the neurons in input layer 620 generates an output that is fed to the inputs of a hidden layer 631. Hidden layer 631 includes a plurality of neurons that process the outputs from input layer 620. In some examples, each of the neurons in hidden layer 631 generates an output that are then propagated through one or more additional hidden layers that end with hidden layer 639. Hidden layer 639 includes a plurality of neurons that process the outputs from the previous hidden layer. The outputs of hidden layer 639 are fed to an output layer 640. Output layer 640 includes one or more neurons that are used to condition the output from hidden layer 639 by scaling, range limiting, and/or the like. It should be understood that the architecture of neural network 600 is representative only and that other architectures are possible, including a neural network with only one hidden layer, a neural network without an input layer and/or output layer, a neural network with recurrent layers, and/or the like.

In some examples, each of input layer 620, hidden layers 631-639, and/or output layer 640 includes one or more neurons. In some examples, each of input layer 620, hidden layers 631-639, and/or output layer 640 may include a same number or a different number of neurons. In some examples, each of the neurons takes a combination (e.g., a weighted sum using a trainable weighting matrix W) of its inputs x, adds an optional trainable bias b, and applies an activation function $f$ to generate an output a as shown in Equation 3. In some examples, the activation function $f$ may be a linear activation function, an activation function with upper and/or lower limits, a log-sigmoid function, a hyperbolic tangent function, a rectified linear unit function, and/or the like. In some examples, each of the neurons may have a same or a different activation function.

$$a = f(Wx+b) \quad \text{Equation 3}$$

In some examples, neural network 600 may be trained using supervised learning (e.g., during process 290) where combinations of training data that include a combination of input data and a ground truth (e.g., expected) output data. Differences between the output of neural network 600 as generated using the input data for input data 610 and comparing output data 650 as generated by neural network 600 to the ground truth output data. Differences between the generated output data 650 and the ground truth output data may then be fed back into neural network 600 to make corrections to the various trainable weights and biases. In some examples, the differences may be fed back using a back propagation technique using a stochastic gradient descent algorithm, and/or the like. In some examples, a large set of training data combinations may be presented to neural network 600 multiple times until an overall loss function (e.g., a mean-squared error based on the differences of each training combination) converges to an acceptable level.

Methods according to the above-described embodiments may be implemented as executable instructions that are stored on non-transitory, tangible, machine-readable media. The executable instructions, when run by one or more processors (e.g., processor 510 and/or process 555) may cause the one or more processors to perform one or more of the processes of methods 200 and/or 400. Some common forms of machine-readable media that may include the processes of methods 200 and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Devices implementing methods according to these disclosures may comprise hardware, firmware, and/or software, and may take any of a variety of form factors. Typical examples of such form factors include laptops, smart phones, small form factor personal computers, personal digital assistants, and/or the like. Portions of the functionality described herein also may be embodied in peripherals and/or add-in cards. Such functionality may also be implemented on a circuit board among different chips or different processes executing in a single device, by way of further example.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising: one or more optical biometers configured to obtain one or more pre-operative measurements of an eye of a current patient;
   a prediction engine comprising:
   one or more processors; and memory containing a plurality of machine-readable instructions which when executed by one or more processors are adapted to cause the one or more processors to:
   train a neural network emmetropia zone prediction model using a set of data from a collection of eyes of a plurality of previous patients, wherein the set of data includes an estimated post-operative manifest refraction in spherical equivalent (MRSE) for each of the plurality of previous patients and an actual post-operative MRSE for each of the plurality of previous patients where a post-operative eye was placed in an emmetropia zone of the previous patients;
   train a neural network non-emmetropia zone prediction model using a set of data from a collection of eyes of previous patients, wherein the set of data includes an estimated post-operative manifest refraction in spherical equivalent (MRSE) for each of the plurality of previous patients and an actual post-operative MRSE for each of the plurality of previous patients where a post-operative eye was placed in a non-emmetropia zone of the previous patients;
   receive, from the one or more optical biometer, the one or more pre-operative measurements of the eye of the current patient;
   estimate, based on the one or more pre-operative measurements of the eye of the current patient, a post-operative anterior chamber depth (ACD) of an intraocular lens (IOL);
   estimate, based on the one or more pre-operative measurements of the eye of the current patient and the estimated post-operative ACD, a post-operative manifest refraction in spherical equivalent (MRSE) of the eye of the current patient with the IOL implanted;
   determine, based on the estimated post-operative MRSE, whether the eye of the current patient with the IOL implanted is likely to be in an emmetropia zone;
   selecting the emmetropia zone prediction model based on determining that the eye of the current patient with the IOL implanted has a likelihood greater than or equal to a threshold value as being in the emmetropia zone, re-estimate the post-operative MRSE of the eye with the IOL implanted using the emmetropia zone prediction model, and
   selecting the non-emmetropia zone prediction model based on determining that the eye of the current patient with the IOL implanted is not likely to be in the emmetropia zone, re-estimate the post-operative MRSE of the eye with the IOL implanted using the non-emmetropia zone prediction model; and
   provide the re-estimated post-operative MRSE to a user to aid in selection of an IOL for implantation in the eye of the current patient;
   wherein the one or more optical biometers are further configured to:
   obtain one or more postoperative measurements of the eye of the current patient with the IOL implanted; and
   update, based on the one or more post-operative measurements of the eye of the current patient, one of the neural network non-emmetropia zone prediction model or the neural network emmetropia zone prediction model.

2. The system of claim 1, wherein to estimate the post-operative ACD, the prediction engine is configured to:
   generate a first estimate using a geometric model of the eye; and
   update the first estimate using a neural network-based prediction model.

3. The system of claim 1, wherein to determine whether the eye with the IOL implanted is in the emmetropia zone, the prediction engine is configured to use a classifier and a receiver operator characteristic curve.

4. The system of claim 1, wherein the prediction engine is further configured to:
   estimate and re-estimate a post-operative MRSE of a second IOL; and
   present the re-estimated post-operative MRSE of the IOL and the re-estimated post-operative MRSE of the second IOL to the user to aid the user in the selection of the IOL for implantation in the eye;

wherein the IOL and the second IOL have different IOL powers.

* * * * *